Oct. 25, 1966     E. BLOCH     3,281,029
DEVICE FOR SUPPORTING DISPLAY FIGURES
Filed March 15, 1962     6 Sheets—Sheet 1

INVENTOR
ERICH BLOCH
BY
S. Augustus Semma
ATTORNEY

Oct. 25, 1966   E. BLOCH   3,281,029
DEVICE FOR SUPPORTING DISPLAY FIGURES
Filed March 15, 1962   6 Sheets-Sheet 2

INVENTOR
ERICH BLOCH
BY
S. Augustus Lemma
ATTORNEY

Oct. 25, 1966     E. BLOCH     3,281,029
DEVICE FOR SUPPORTING DISPLAY FIGURES
Filed March 15, 1962     6 Sheets-Sheet 5

INVENTOR
ERICH BLOCH
BY
*J. Augustus Gemma*
ATTORNEY

Oct. 25, 1966  E. BLOCH  3,281,029
DEVICE FOR SUPPORTING DISPLAY FIGURES
Filed March 15, 1962  6 Sheets-Sheet 6

INVENTOR.
ERICH BLOCH
BY
S. Augustus Lemma
ATTORNEY

United States Patent Office 3,281,029
Patented Oct. 25, 1966

3,281,029
DEVICE FOR SUPPORTING DISPLAY FIGURES
Erich Bloch, 556 W. 141st St., New York, N.Y.
Filed Mar. 15, 1962, Ser. No. 179,958
35 Claims. (Cl. 223—120)

The present invention relates to devices of the type employed to support display figures and particularly to devices for supporting manikins.

It has been proposed to provide a device for supporting a display figure having a lower portion simulating a leg and a lower extremity simulating a foot. This device comprises a clamp adapted to rest on a floor and to support the figure in upright position by anchoring the lower foot extremity in position. A device of this general type is disclosed in U.S. Patent No. 2,867,362.

A general object of the present invention is to provide a new and improved figure display device of the general type described.

Another object of the present invention is to provide a new and improved figure display device of the general type described, which engages the lower foot extremity of the display figure and supports the display figure without exerting destructive clamping pressures on the lower foot extremity itself.

Another object of the present invention is to provide a new and improved figure display device, which engages the lower foot extremity of the display figure and which permits the figure to wear a stocking without punching or otherwise destroying the stocking.

Another object of the present invention is to provide a new and improved figure display device of the general type described, which is comparatively simple and almost unobtrusive in appearance and which can be easily set up, manipulated and adjusted to accommodate lower foot extremities of different sizes and selectively in different angular positions.

A further object of the present invention is to provide a new and improved device of the general type described, which supports a display figure of the character described through anchoring engagement with a lower foot extremity of the display figure, and which can be easily converted to anchor either a lower foot extremity having a shoe or a lower foot extremity without a shoe.

A further object of the present invention is to provide a manikin support device of the improved type described, which can be applied to existing manikins, as for example, of the type now being supported by upright impaling rods.

A further object of the present invention is to provide a new and improved device of the general type described, which supports a display figure adjustably in display positions and which can easily be set up to support a display figure for storage.

A further object of the present invention is to provide a display figure made of easily breakable materials such as plaster, plastic or papier-mâché, which has a lower extremity simulating a foot, and which has permanently set into said lower foot extremity to form a self-contained unit therewith a reinforcing member adapted to receive the support afforded by a pair of flanking jaws forming part of a figure supporting device.

Various other objects are apparent from the following description and from the accompanying drawings, in which.

Referring to FIGS. 1–8 of the drawings, there is shown a manikin support device comprising a flat metal base plate 10 adapted to be placed on a floor on which a display manikin A is to be sustained in upright display position. The display manikin A has lower portions B simulating legs and lower extremities simulating the feet, the lower foot extremity to be anchored being referred to by the letter C. The base plate 10 carries a clamp device 11 to which the manikin foot can be removably and adjustably secured to support the manikin in upright position.

Figures 2, 6:
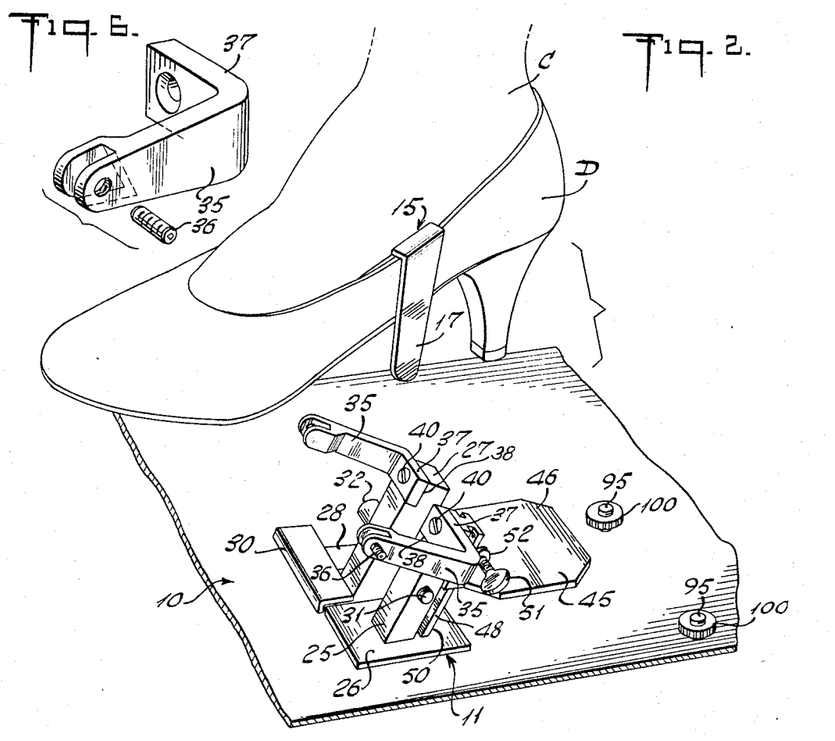
FIG. 2 is a perspective showing the display support device of FIG. 1 set up to support a manikin wearing shoes and shown with the shoed foot of the manikin about to be secured to the support device.
FIG. 6 is an exploded perspective of one of the clamping jaw arms of the display support device and of the corresponding clamping screw employed for a shoed manikin foot.
Figures 3, 7, 8:
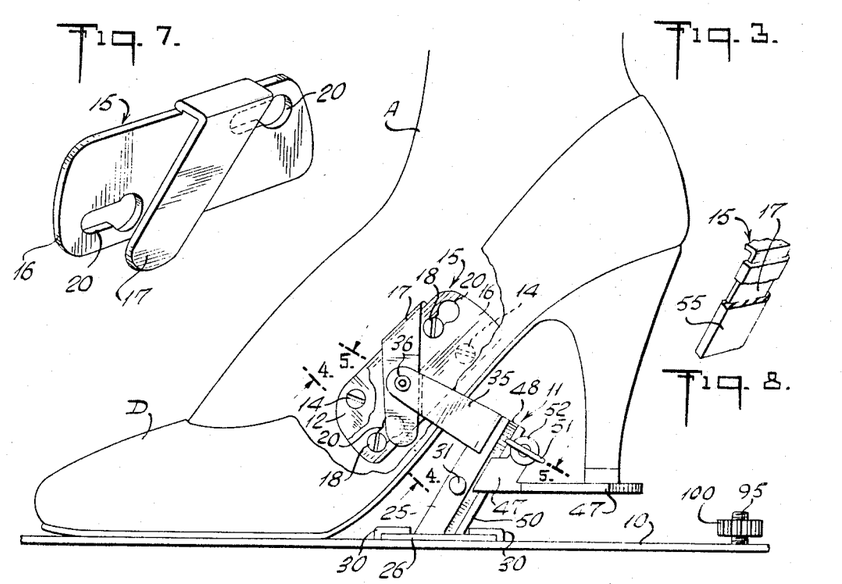
FIG. 3 is a side elevation of the display support device of FIGS. 1 and 2 shown in position supporting the shoed foot of the manikin.
FIG. 7 is a perspective of one of the adapter side plates designed to be attached to a side of the manikin foot and carrying a tongue for attachment to the jaw end of the jaw arm of FIG. 6.
FIG. 8 is a perspective of a section of the tongue shown in FIG. 7 with an attached cover clip for coloring said tongue to match the color of the manikin's shoes so that said tongue can be almost unobtrusive.
Figure 4:
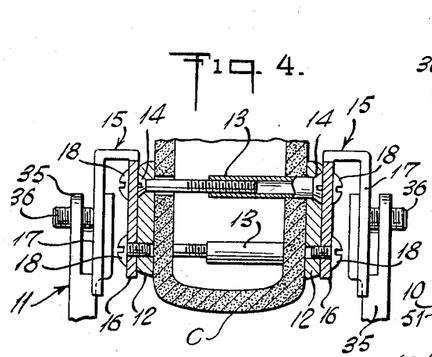
FIG. 4 is a section of the display support device of FIGS. 1 and 2 with the shoed foot of the manikin taken on lines 4—4 of FIG. 3.
Figure 5:
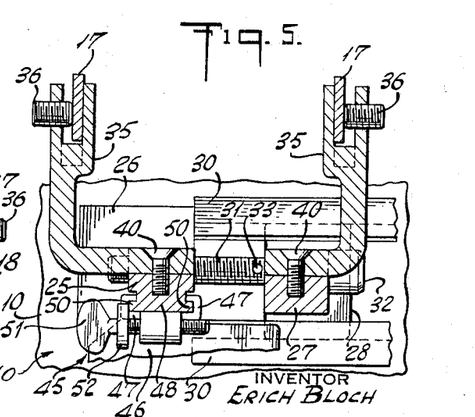
FIG. 5 is a section of the display support device of FIGS. 1 and 2 with the shoed foot of the manikin taken on lines 5—5 of FIG. 3.

The manikin is made of plaster, plastic, papier-mâché or similar breakable material and in order to prevent strong points of attachment on the manikin for the clamp device 11 and at the same time reinforce the manikin foot C to be anchored, there are provided a pair of foot anchor plates 12 desirably made of strong material, such as metal. These foot plates 12 flank the manikin foot C and are secured to the opposite sides of the foot in the regions above the arch by means of telescoping screws 13 with heads 14 retained snugly in countersunk holes in said plates. The foot anchor plates 12 are designed to removably support adapter side plates adapted for use with the clamp device 11, the character of these adapter side plates depending on whether the manikin foot C to be anchored has a shoe or is without a shoe. In the form of the invention shown in FIGS. 1–8, the manikin support device is designed to support a manikin wearing shoes D, and for that purpose there are provided adapter side plates 15 (FIGS. 2, 3, 4, 5 and 7) adapted to be removably secured to the foot anchor plates 12 respectively. Each of these side plates 15 comprises a flat body frame section 16 adapted to be removably secured to the corresponding foot anchor plate 12 in face to face relationship therewith and a tongue 17 adapted to be removably attached to the clamp device 11 in the manner to be described. These tongues 17 are integrally connected to the upper edges of the side plate frame sections 16 and depend therefrom at an angle to bring the tongues substantially vertically or at least in upright position when the manikin foot C is clamped in position. The side plates 15 are substanitally in the form of stirrups with the tongues 17 extending substantially parallel to the side plate frame section 16 and spaced therefrom sufficiently to permit the side plates to straddle the corresponding sides of the manikin shoe D with the plate sections 16 inside the shoe and the tongues outside, as shown in FIGS. 2 and 3.

The foot anchor plates 12 and the side plates 15 are designed to permit easy removable attachment of said side plates to the foot plates. For that purpose, the foot plates 12 have headed studs 18, shown in the form of machine screws threaded therein, and the main sections 16 of the side plates have slots 20 enlarged at one end to receive the heads of the studs and having respective sections of reduced width beyond said ends to prevent the stud heads from passing through said reduced slot sections but wide enough to permit the shanks of the studs to slide therealong. For attachment, the side plates 15 are placed over the foot anchor plates 12 in face contact therewith with the studs 18 passing through the enlarged ends of the slots 20, and the side plates are slid along the foot plates until the studs are on the opposite narrower ends of the slots. If no stockings are employed, and the studs 18 are in the form of screws as shown, these studs can be tightened to clamp their heads against the side plates 15, as shown in FIG. 3. If desired, the studs 18 need not be in the form of screws but can be in the form of a fixed headed pins, especially where a stocking is to cover the foot and the anchor plates 12.

Where a stocking is to be worn by the manikin on the leg to be supported, this stocking covers not only the foot but also the anchor plates 12 including the studs 18. The adapter side plates 15 are placed against the stocking and attached to the anchor plates 12 through the studs 18 in the manner described and since the stocking is flexible and stretchable and will yield conformably between the anchor plates and the adapter plates, it will not be injured or destroyed.

The clamp device 11 shown in FIGS. 2–5, comprises a fixed post 25 affixed to a plate 26 which in turn is affixed to the base plate 10 of the display support device. This fixed post 25 slopes upwardly and rearwardly of the base plate 10. Alongside of the fixed post 25 is an adjustable post 27 substantially parallel to the post 25 and secured to a plate 28 which in turn is slidably retained in guides 30 affixed to the base plate 10. A screw 31 threaded in the fixed post 25 and passing freely through the adjustable post 27 has a head 32 bearing against one side of the post 27, and a pin 33 bearing against the other side of the post so that the turning of the head causes the post 27 to move along the guides 30, thereby permitting the distance between the posts to be adjusted, while maintaining the posts parallel.

Removably secured to the upper ends of the posts 25 and 27 respectively are two substantially parallel jaw arms 35 extending transversely of the posts to form with said posts a U-shape frame. These arms 35 are attached to the posts 25 and 27 and are removable and replaceable by other types of arms because the character of the arms depends on whether or not the manikin is wearing shoes. For the set up shown in FIGS. 1–8 in which the manikin is wearing shoes, the arms 35 are designed for clamping action on the tongues 17 of the side plates 15. For that purpose, the outer end of each arm 35 is cleft to provide a pair of opposed ears to receive the tongue 17 of the corresponding side plate 15 and the outside ear carries a screw 36 with a socket at its outer end to receive a turning tool, the inner end being adapted to impinge against the tongue and to press the tongue against the other ear. These screws 36 thereby serve as jaws for the U-shaped frame made up of the posts 25 and 27 and the arms 35.

The inner ends of the arms 35 have short offsets 37 and the upper ends of the posts 25 and 27 are formed with respective rabbets 38 to receive these arm offsets. Screws 40 passing through the arm offsets 37 hold the arms 35 removably in place.

The clamp device 11 is also provided with an adjustable platform 45. The shoe D of the manikin A to be anchored is set with its sole resting directly on the base plate 10 in front of the clamp device 11 and the heel elevated to the proper elevation and with the tongues 17 of the side plates 15 passing through the cleft ends of the arms 35. The platform 45 is elevationally adjusted to accommodate manikin shoes of different heel heights or to accommodate shoes in different tilted positions according to the pose of the manikin, as shown in FIG. 3, and for that purpose can be raised to meet the heel of the shoe set as described. After the platform 45 is so raised, the screws 36 are tightened against the tongues 17 in the cleft ends of the arms 35.

The platform 45 comprises a plate 46 on one side of which is secured a U-shaped clamp 47 slidably embracing a guide bar 48 secured to and extending along the rear side of the fixed post 25. The angle of the plate 46 in relation to the clamp 47 and the fixed post 25 is such that the plate is substantially parallel to the base plate 10 in all adjusted positions of the platform 45.

The guide bar 48 is formed with side tenons 50 embraced by the sides of the clamp 47, and a thumb screw 51 serves to tighten the clamp 47 onto the guide bar after the platform 45 has been elevationally adjusted along said guide bar. This screw 51 has a shoulder 52 which bears against the side of the guide bar 48 when the screw is tightened to lock the platform 45 in elevationally adjusted position.

There is enough play between the clamp 47 and the guide bar 48 to permit the platform 45 to be moved freely along the guide bar for adjustment when the screw 51 is loose. Since the center of gravity of the platform 45 is offset from the guide bar 48, when the platform is manually released after its elevation has been adjusted, the leverage provided by this offsetting of the center of gravity, will cause the clamp 47 by the action of gravity to jam against the guide bar when the platform 45 is manually released, thereby preventing downward movement of the platform along the guide bar unless the platform is first tilted upwardly slightly to release the clamp from jamming engagement with the guide bar.

With the construction of the platform 45 described, the manikin shoe D is set up and tilted into the desired angular position on the base plate 10 and the platform 45 is raised to meet the heel of the shoe. Release of the platform 45 manually will lock the platform against downward movement until the screw 51 is ready to be tightened.

The support device is almost unobtrusive because of its comparative simplicity and its compact structure with its parts arranged close to the manikin shoe D. However, since the tongues 17 extend on the outside of the manikin shoes D, it may be desirable to render these tongues even less obtrusive. For that purpose, removable cover clips 55 (FIG. 8) made, for example, of plastic, and colored to conform with the color of the shoes worn by the manikin may be clasped onto the outside of the tongues 17 by the inherent resiliency of the clips before the tongues are passed through the cleft ends of the arms. These clips 55 may be replaced by clips of different colors according to the color of the manikin's shoes.

In the modification of FIGS. 1–8, while the shoe D is off the manikin's foot C to be anchored, the adapter side plates 15 are attached by means of the studs 18 to the foot plates 12 secured to the sides of the foot and the shoe is then slipped over the foot with the tongues 17 on the outside of the shoe as shown in FIG. 2. The shoed manikin foot C is then set up into the desired position with the tongues 17 passing through the cleft ends of the arms 35, after the adjustable post 27 has been moved by the turning of the screw 31 into position to space the cleft ends of the arms in accordance with the space between the tongues. While the shoed foot C is held into desired position with the sole of the shoe D seated on the base plate 10 and the heel of the shoe at the desired elevation, the platform 45 is raised to the level of the heel, whereupon the platform can be released, since it will be gravitationally locked by this action against downward movement. With the shoed manikin foot so set up, the screws 36 forming the jaws of the arms 35 are tightened and the thumb screw 51 is tightened to lock the platform in elevated position.

Figures 9, 12, 13, 14, 15:
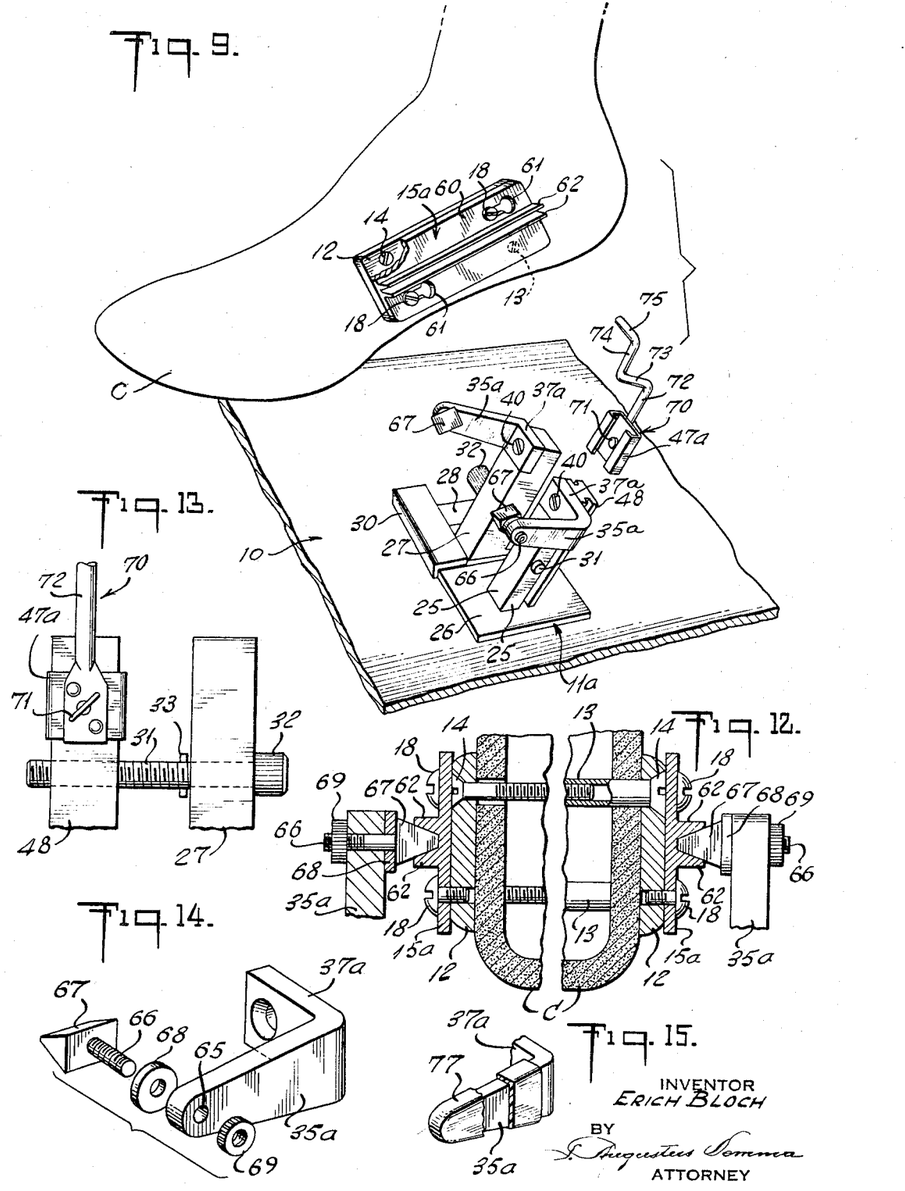
FIG. 9 is an exploded perspective view of a display support device constituting another embodiment of the present invention and shown set up in condition to support a shoeless manikin foot with attached adapter side plate ready to be supported on said device.
FIG. 12 is a section of the display support device taken on lines 12—12 of FIG. 10.
FIG. 13 is a fragmentary view of the display support device taken on lines 13—13 of FIG. 10.
FIG. 14 is an exploded perspective view of one of the clamping jaw arms of the display support device and of the corresponding jaw piece and screw employed for a shoeless manikin foot.
FIG. 15 is a fragmentary perspective of the jaw arm of FIG. 14 shown with an attached cover clip colored to correspond to the color of the foot to render said arm unobtrusive.

The manikin A with only one foot anchored to the support device will, nevertheless, be steadily supported in upright free standing natural display position, and in such a way that this device is almost concealed from view without the use of the usual impaling manikin support rod. If desired, to render the support device even less obtrusive, the colored cover clips 55 may be applied to the tongues 17, as shown in FIG. 8, before the manikin's shoed foot with the side plates 15 applied thereto are clamped to the clamp device 11. If desired, similar colored clips may be applied to the arms 35 to conceal at least major portions of these arms, as shown in FIG. 15 in connection with the modification of the invention shown in FIGS. 9–15.

FIGS. 9–15 show how the support device in FIGS. 1–8 may be converted by comparatively small changes and appropriate adapter side plates to support a manikin having feet with no shoes, as for example, when displaying a manikin with a bathing suit, a night gown or the like requiring no shoes. For that purpose, the same manikin which can be supported with shoes as described in connection with FIGS. 1–8 and bearing the same foot plates 12 have applied thereto adapter side plates 15a. These side plates 15a have flat plate sections 60 adapted to be placed in face to face contact with the foot plates 12 and having slots 61 similar to the slots 20 in the side plates 15 of FIGS. 1–8 to receive the studs 18. Along the outside of each side plate 15a are two parallel ribs 62 conjointly forming a V-runway or guide to adjustably receive the jaws of the U-shaped frame of the clamp device, as will be described. If the manikin's foot is wearing a stocking, this stocking will be covering the foot, the anchor or foot plates 12 and the attached adapter side plates 15 without being destroyed.

The clamp device 11a is the same as the clamp device 11 in the construction of FIGS. 1–8, except for the jaw arms. For anchoring the manikin foot C without the shoe when the manikin is to be displayed without shoes, the jaw arms 35 are replaced by jaw arms 35a having offset inner ends 37a for attachment to the posts 25 and 27 respectively by means of the screws 40, and having outer ends with respective holes 65 serving as journals for screws 66 secured to jaws 67 shown in the shape of triangular prisms, to serve as wedges. As washer 68 on each screw 66 and a nut 69 threaded on said screw flank the outer end of the corresponding jaw arm 35a and serve to retain pivotally the corresponding jaw 67 on said jaw arm.

The jaw arms 35a in conjunction with the posts 25 and 27 form a U-shaped frame and in anchoring the manikin foot C in the desired position, the manikin foot is inserted between the arms with the jaws 67 extending into the guides formed by the ribs 62 of the adapter side plates 15a and the foot is adjusted by moving said foot along the length of the guides and tilting said foot to the desired extent. When the manikin foot C is set in the proper position, the screw 31 is turned to clamp the jaw 67 tight against the guides formed by the ribs 62 on the side plates 15a. In case where the manikin's foot with the anchor plates 12 and the adapter plates 15a are covered with a stocking, the jaws 67 would press the stocking conformably in the space between the ribs 62 without damaging the stocking.

Figures 10, 11:
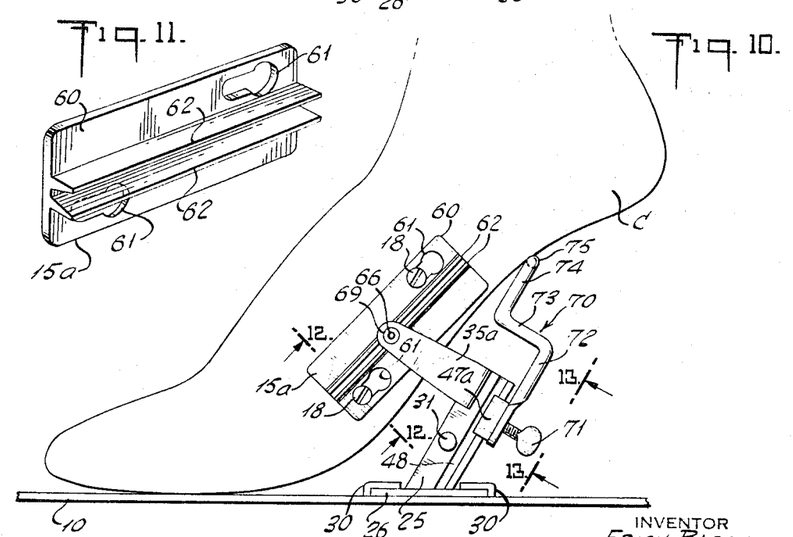
FIG. 10 is a side elevation of the display support device of FIG. 9 shown supporting the shoeless foot of the manikin.
FIG. 11 is a perspective of one of the adapter side plates designed to be attached to a side of the manikin's foot and carrying a guide or runway for adjustably receiving the end of a clamping jaw arm forming part of the display support device when the support device is set up to support a shoeless manikin.

With the construction of FIGS. 9–15, in order to support the bare manikin foot C in display position of the manikin shown in FIG. 10 with the sole of the foot resting on the base plate 10 and the heel elevated above said plate, the platform 45 in the construction of FIGS. 1–8 is replaced by a wire heel support 70. This heel support 70 is secured at its lower end to a U-shaped clamp 47a slidably embracing the guide bar 48 and carrying a thumb screw 71 adapted to impinge against the outer face of the guide bar in tightened position of said thumb screw. This wire support 70 has a base section 72 extending in the longitudinal direction of the guide bar 48, a lower intermediate section 73 offset inwardly substantially at right angles to the base section towards the heel of the manikin foot C, an upper intermediate section 74 extending upwardly parallel to the base section and an upper end section 75 offset at right angles to the intermediate section 74 substantially parallel to the base plate 10 and in direction across the manikin's foot C to form a stable rest for the heel of the foot. The different offsets in the wire support 70 described serve to set the outer offset end section 75 of this support inwardly a substantial distance from the outer end of the heel of the foot C to support the foot stably.

If it is desired, a clip 77 (FIG. 15) made, for example, of plastic and colored to match the color of the manikin's foot, namely, flesh color, may be provided to cover each jaw arm 35a and to render said arm thereby less obtrusive. These clips 77 have enough resiliency to permit them to be clasped onto and to be removably retained on the jaw arms 35a.

As another alternative, the jaw arms 35a may be made of metal having metal oxide coatings that may be dyed, as for example, aluminum. Such aluminum parts with anodized surfaces, may for example, be dyed flesh color to render them unobtrusive. In that case, even the adapter side plates 15a may be so dyed.

In the forms of the invention shown in FIGS. 1–8 and FIGS. 9–15, the manikin A is of the usual type made of plaster, plastic or papier-mâché, and therefore of breakable material, and in order to reinforce these manikins for use in conjunction with the support device of the present invention, it was desirable to secure thereto on opposite sides of the manikin foot to be anchored the reinforcing foot plates 12. FIGS. 16–21 show different modifications in which a reinforcing bracket of structural shape is built into and is permanently secured to the foot of the manikin in the manufacture of the manikin to form a self-contained unit with the manikin.

Figure 16:
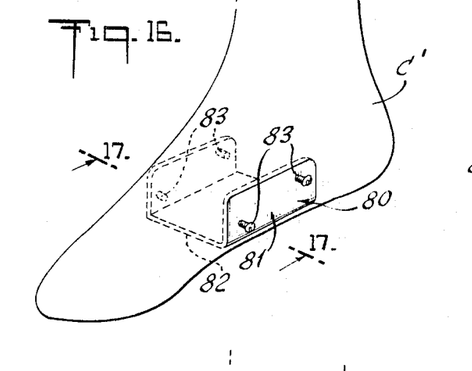
FIG. 16 is a perspective of a manikin's foot showing a reinforcing U-shaped permanently secured thereto to form a self-contained unit therewith and adapted to support either one of the adapter side plates shown in FIG. 7 or FIG. 11.
Figure 17:
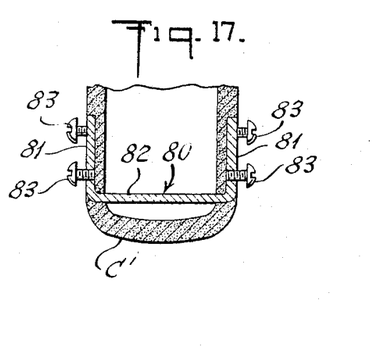
FIG. 17 is a section of the reinforced manikin foot of FIG. 16 taken on lines 17—17 of FIG. 16.

FIGS. 16 and 17 show one of the modifications employing a specially manufactured manikin. In this modification, the manikin made of plaster, plastic, papier-mâché or similar breakable material, has its foot C' to be anchored provided with a U-shaped bracket 80, which is desirably made of metal, and built into the foot as to constitute a permanent part thereof, and which is incorporated therein during the manufacture of the manikin. This bracket 80 comprises foot anchor plates 81 embedded into the material of the manikin foot C' and having their outer surfaces flush with the outer surfaces of the foot, and a base plate 82 extending between these foot plates and spanning the side walls of the foot. The foot plates 81 carry headed studs 83, which are shown in the form of machine screws, but which can be in the form of fixed headed stud pins, especially where the manikin is to wear stockings. These studs 83 are located in positions corresponding to the positions of the studs 18 in the foot anchor plates 12 in the embodiments of FIGS. 1–16 for attachment of the adapter side plates 15 or the adapted side plates 15a, according to whether the reinforced foot C' is to be displayed with the shoe D, as in the embodiment of FIGS. 1–8 or without the shoe, as in the embodiment of FIGS. 9–15. The side plates 15 or 15a are secured to the foot plates 81 and the manikin's foot C' is anchored to the clamp device in the manner described in FIGS. 1–8 or in the manner described in FIGS. 9–15.

Figure 18:
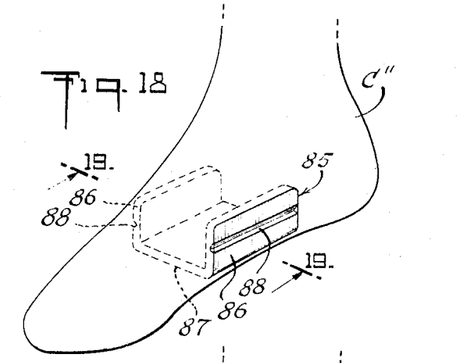
FIG. 18 is a perspective of a manikin foot showing as another embodiment of the present invention a reinforcing U-shaped bracket permanently secured thereto to form a self-contained unit therewith and adapted to cooperate with the jaws of FIGS. 9, 10, 11 and 12 for the support of a shoeless manikin.
Figure 19:
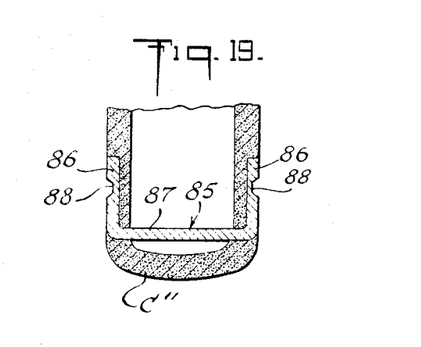
FIG. 19 is a section of the reinforced manikin foot taken on lines 19—19 of FIG. 18.

FIGS. 18 and 19 show a specially manufactured manikin made of plaster, plastic, papier-mâché or similar breakable material and designed to be displayed without shoes. The manikin foot C" to be anchored is reinforced with a U-shaped bracket 85, desirably made of metal, and built into the foot during the manufacture of the manikin to constitute a permanent part thereof. This bracket 85 is designed to reinforce the manikin foot C" and at the same time to obviate the necessity of employing side adapter plates, such as the side adapter plates 15a in the embodiment of FIGS. 9–15. To that end, the bracket 85 comprises foot anchor plates 86 embedded into the material of the manikin foot C" with their outer surfaces flush with the outer surfaces of the foot, and a base plate 87 extending between these foot plates and spanning the side walls of the foot. Each foot plate 85 has a V-groove 88 forming a runway or guide to adjustably receive directly the corresponding jaw 67 of the clamp device 11a shown in FIGS. 9–15. The manikin foot C" reinforced, as described, can be anchored to the clamp device 11a in the manner described in connection with the embodiment of FIGS. 9–15.

If desired, the anchor plates 86 of the bracket 85 in the construction of FIGS. 18 and 19 may be provided with headed studs similar to the studs 83 in the construction of FIGS. 16 and 17 and similarly located to receive the adapter plates 15 shown in FIGS. 1–8, in case it is desired to also display the manikin without shoes. This combination makes it possible to display the manikin either with shoes or without shoes, since the relatively small headed studs will not impair the looks of the display when the manikin is displayed without shoes.

Figure 20:
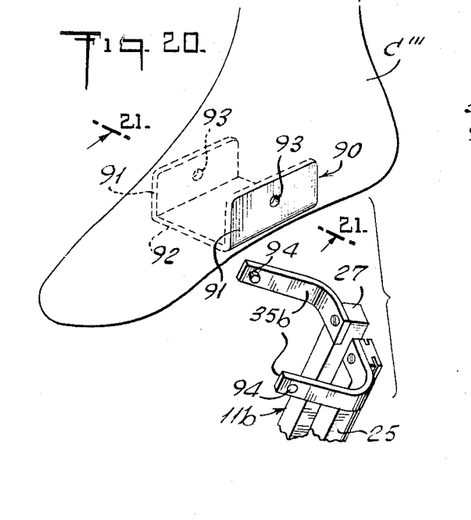
FIG. 20 is an exploded perspective view of a reinforced manikin foot showing as still another embodiment of the present invention a reinforcing bracket permanently secured thereto to form a self-contained unit therewith, and the support jaw arm forming part of the display device for supporting the shoeless manikin.
Figure 21:
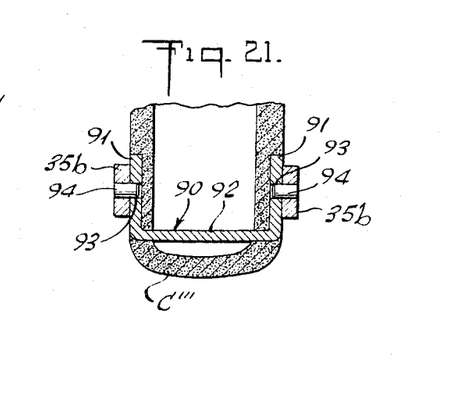
FIG. 21 is a section of the reinforced manikin foot taken on lines 21—21 of FIG. 20.

FIGS. 20 and 21 show a specifically manufactured manikin made of plaster, plastic, papier-mâché or similar breakable material and designed to be displayed without shoes. The manikin foot C''' to be anchored is reinforced with a U-shaped bracket 90, desirably made of metal and built into the foot during the manufacture of the manikin to constitute a permanent part thereof. This bracket 90 is designed to reinforce the manikin foot C''' and at the same time to obviate the necessity of employing side adapter plates, such as the side adapter plates 15a in the embodiment of FIGS. 9–15. To that end, the bracket 90 comprises foot anchor plates 91 embedded into the material of the manikin foot C''' with their outer surfaces flush with the outer surfaces of the foot and a base plate 92 extending between these foot plates and spanning the side walls of the foot. The foot plates 91 have respective aligned holes 93 serving as bearings for trunnions 94 carried at the outer ends of jaw arms 35b forming part of a clamp device 11b.

The clamp device 11b is similar to the clamp devices 11 and 11a in the forms of the invention shown in FIGS. 1–8 and FIGS. 9–15, and similarly includes the post 25 affixed to the base plate (not shown) and the post 27 adjustably supported in guides (not shown) affixed to said base plate, as in the constructions of FIGS. 1–15 and similarly adjusted by a screw similar to the screw 31 in said constructions. The upper ends of the posts 25 and 27 are recessed to receive the offset inner ends of the jaw arms 35b, and the trunnions 94 serving as the jaws for said arms are in the form of aligned pins affixed to the outer ends of said arm, as for example, by press-fitting in holes in said arms, and having heads on their outer ends abutting the outer sides of the arms and trunnion ends projecting inwardly from the inner sides of said arms towards each other.

The clamp device 11b has a wire heel support similar to the wire heel support 70 in the construction of FIGS. 9–15 and similarly adjustably supported on the guide bar 48 secured to the rear side of the fixed post 25.

In anchoring the manikin foot C''' to the clamp device 11b, the jaw arms 35b are spread apart sufficiently to place the foot therebetween, by turning the adjusting screws corresponding to the screw 31 in the constructions of FIGS. 1–15. With the jaw arms 35b so spread apart, the manikin foot C''' is inserted between the jaw arms 35b with the trunnions 94 aligned with the holes 93 in the foot plates 91 of the bracket 90, and the adjusting screw for the post 27 is turned to move the jaw arms 35b towards each other and to move the trunnions into the holes 93 to pivotal support the manikin foot C''' thereon. Even with the manikin's foot C''' wearing a stocking over the foot plates 91, the penetrations of the trunnions 94 into the holes 93 are not sufficient and the holes are not so small as to injure the stocking.

With the manikin foot C''' supported as described, the heel support (not shown) corresponding to the wire heel support 70 in the construction of FIGS. 9–15 is raised to the heel of the foot while the sole of the foot is resting on the base plate and while said foot is tilted at the right angle, and the adjusting screw for the post 27 is turned still further to clamp the outer ends of the jaw arms 35b tight against the foot plates 91. The manikin foot C''' so supported will be firmly anchored in position to hold the manikin firmly in natural display position.

In the modification of the invention shown in FIGS. 9–15, instead of providing the foot plates 12 attached to the foot of the preformed manikin A and then providing separate adapter side plates 15a for use with the clamp device 11a, some of the features in the embodiment of FIGS. 18 and 19 may be employed by providing the foot plates 12 of FIGS. 9–15 with V-grooves similar to the V-grooves 88 in the construction of FIGS. 18 and 19 to form runways or guides adapted to adjustably receive directly the jaws 67 of the clamp device 11a. The foot plates so constructed would be separate but would be attached to the sides of the preformed manikin by means of telescoping screws, as in the construction of FIGS. 1–15, but since adapter side plates corresponding to the adapter side plates 15a in the construction of FIGS. 9–15 would not be needed and, therefore, would be dispensed with, the foot plates would have no studs corresponding to the studs 18 in these constructions.

Instead of dispensing with the adapter side plates by having the separate foot plates which is attachable to the foot of the preformed manikin provided with V-grooves to receive directly the jaws 67 of the clamp device 11 as described, these separate foot plates may have bearing holes for receiving the trunnions 94 of the clamp device 11b, in the manner disclosed in connection with the embodiment of the invention of FIGS. 20 and 21.

Figure 1:
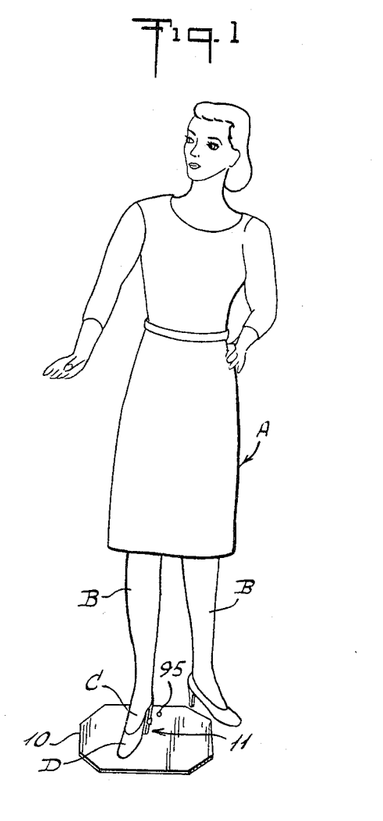
FIG. 1 shows in perspective a display support device embodying the present invention and shown set up and supporting a shoed manikin.
Figure 22:
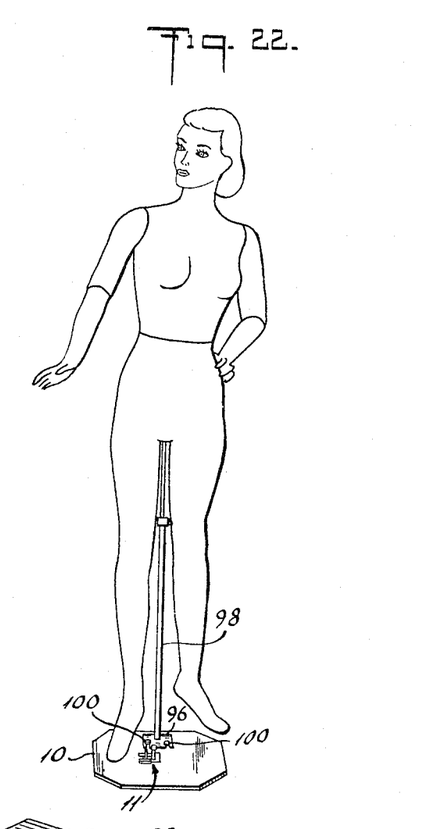
FIG. 22 is a perspective of the base part of the manikin display support device shown with a manikin storage device removably attached thereto and set up to support a manikin for storage.
Figure 23:
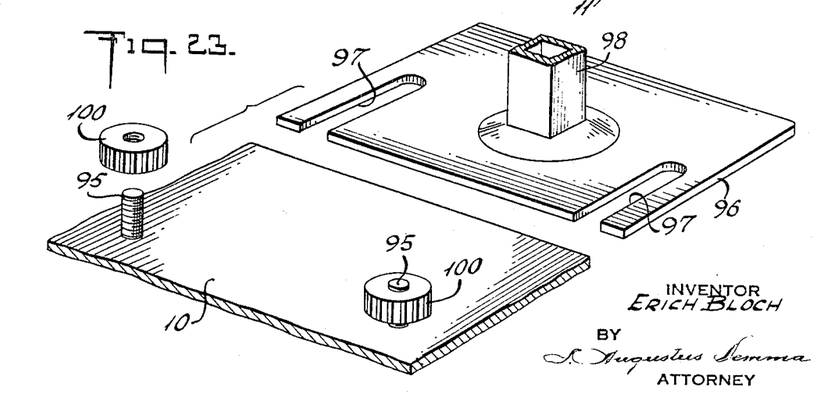
FIG. 23 is a perspective exploded view of the manikin storage device shown in FIG. 22 adapted to be attached to the base plate of the manikin support device.
Figure 24:
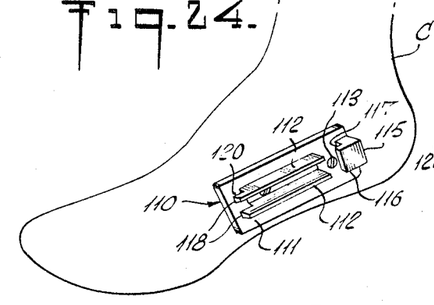
FIG. 24 is a perspective of a manikin's foot and shows as a different embodiment of the invention a foot anchor plate attached thereto and serving not only as a means to reinforce the foot but also as a means for receiving directly clamping support pressure when the manikin is to be supported without shoes.
Figure 25:
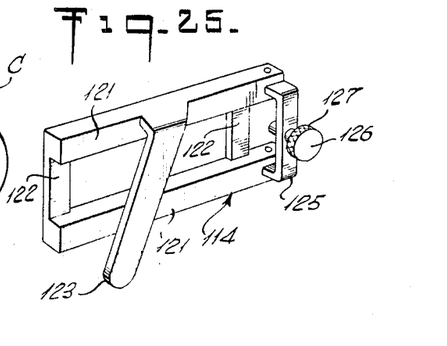
FIG. 25 is a perspective showing an adapter member of the slide locking type, which is designed to be attached to the anchor plate shown in FIG. 24 and which is intended to be used when the manikin wears shoes.

FIG. 1 shows the manikin in display position on the support device in the manner described in connection with the embodiment of the invention shown in FIGS. 1–8. Attachable to the base plate 10 is a device for supporting the manikin A when not in use and when it is desired to support the shoeless manikin in upright position, as for example, for storage. For that purpose, secured to the base plate 10 and projecting upwardly therefrom near the rear of the plate, so as to be unobtrusive when the manikin is in display position, is a pair of threaded studs 95 (FIGS. 1, 22 and 23) projecting upwardly from said plate. The storage support device comprises a plate 96 provided with two notches 97 to receive the studs 95 and an adjustable telescoping stanchion 98 rigidly secured thereto and extending upwardly therefrom. The plate 96 is adapted to be placed on the base plate 10 with the studs 95 passing through the notches 97, and this plate 96 may be firmly secured to said base plate by nuts 100 threaded onto the studs and adapted to be tightened against the plate 96. The body of the manikin is provided near the crotch or rear of the figure in the region of the buttock with a hole (not shown) by which the manikin can be impaled onto the stanchion 98, as shown in FIG. 22, when it is desired to store the manikin for future use. If desired, the parts of the clamp devices 11, 11a or 11b detachable from the base plate 10 may be removed from the base plate, when it is desired to store the manikin in the manner described.

FIGS. 24–28 show a modified form of construction in which the foot anchor plates 12 of FIGS. 1–15 for reinforcing the foot and for removably supporting the adapter plates 15 and 15a according to whether the manikin is to wear shoes or not are replaced by foot anchor plates 110 serving the combined functions of the anchor plates 12 and the adapter plates 15a in the construction of FIGS. 1–15. In this construction of FIGS. 24–28, each foot anchor plate 110 has a plate section 111 adapted to be placed in contact with the corresponding side of the manikin's foot C and two parallel ribs 112 on the outer face of said plate section conjointly forming a V-runway or guide to adjustably receive one of the jaws 67 on the corresponding jaw arm 35a of the clamp device 11 as in the construction of FIGS. 9–15. These anchor plates 110 are secured directly to the sides of the manikin's foot C by means shown in the form of telescoping screws 113 similar to the telescopic screws 13 in the construction of FIGS. 1–15.

When it is desired to support the manikin without shoes, the foot anchor plates 110 in conjunction with the clamp device 11 carrying the jaw arms 35a and the jaws 67 shown in FIGS. 9–15, will be employed in a manner described in connection with the construction of FIGS. 9–15. A stocking on the manikin's leg to be anchored ordinarily covers these foot anchor plates 110, while the jaws 67 on the outside of this stocking press the stocking in the guides formed by the ribs 112 without injuring the stocking, as in the construction of FIGS. 9–15, since this stocking is flexible and stretchable enough to yield into conformance with the contours of the anchor plates and the means for supporting the maniflin does not involve the use of any fastening means, passing through the stocking and into the manikin's foot.

When it is desired to support the manikin while wearing shoes, the foot anchor plate 110 serves as a support for an adapter member 114 designed to be removably secured to said anchor plate and to be removably attached to the clamp device 11 of FIGS. 1–8. This adapter member 114 is designed to be removably secured to the anchor plate 110 and for that purpose, one end of the anchor plate 110 has secured thereto, by integral formation with the plate section 111 thereof, a catch 115 in the form of an anchor post spaced from the adjacent ends of the guide ribs 112 and having an overhanging lip 116 at its outer end defining with said plate section a recess 117. At the other end of the anchor plate 110 is another catch 118 formed by recesses 120 in the guide ribs 112 at the latter end of said anchor plate.

The adapter member 114 for supporting the shoed manikin has a section in the form of an open rectangular rigid frame having parallel side bars 121 extending longitudinally of the adapter member and parallel bars 122 across the ends of said side bars. The opening defined by these frame bars 121 and 122 is large enough to receive therein with a slide confining fit the guide ribs 112 on the anchor plate 110 when the adapter member 114 is seated against the plate section 111 of the anchor plate 110.

Integral with one of the longitudinal side bars 121 of the adapter member 114 or otherwise rigidly secured thereto, is a tongue 123 serving the same function as the tongue 17 in the construction of FIGS. 1–8, and similarly adapted to be removably attached to the clamp device 11. For that purpose, the tongue 123 extends obliquely forwardly of the side bar 121 to which it is secured so that it is almost vertical in supported position of the manikin and is spaced sufficiently from the side bars 121 to permit the adapter member 114 to straddle the corresponding side of the manikin's shoe with the side bars inside the shoe and the tongue outside of the shoe, as in the construction of FIGS. 9–15.

Figures 26, 27, 28, 29:
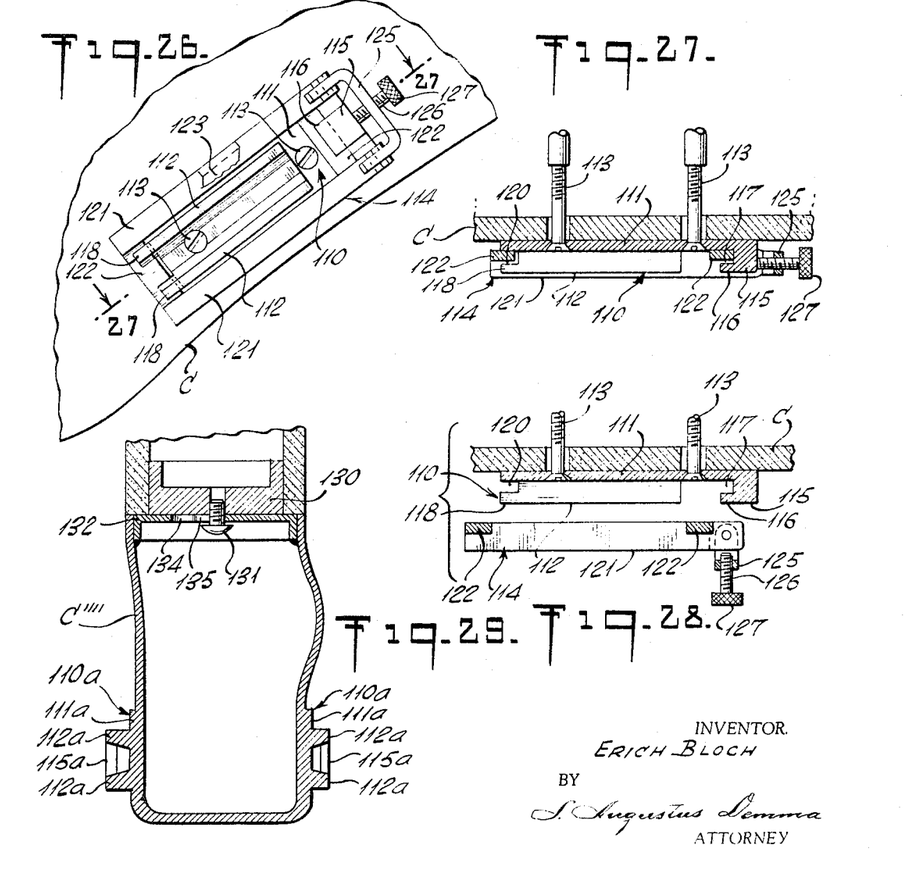
FIG. 26 shows a side fragmentary view of the manikin's foot with the adapter member of FIG. 25 locked to the anchor plate of FIG. 24.
FIG. 27 is a section of the manikin's foot with attached anchor plate and adapter member taken on lines 27—27 of FIG. 26.
FIG. 28 is an exploded sectional view similar to that of FIG. 27 but showing the anchor plate and adapter member just prior to assembly or just subsequent to disassembly.
FIG. 29 is a transverse view of a manikin's foot made of strong material such as aluminum or plastic requiring no reinforcing plates and having integral therewith a foot anchor plate of the general shape shown in FIG. 24.

The cross end bars 122 of the adapter member 114 are located at the base of the adapter member and are thin enough to fit freely in the catch recesses 117 and 120 respectively of the anchor plate 110 in the secured position of the adapter member 114 shown in FIGS. 26 and 27. The distance between the cross end bars 122 is sufficient to permit these bars to be slipped over the ends of the guide ribs 112 in a direction transverse to the plate section 111 of the anchor plate 110 to bring one of the end bars in the space between the catch 115 and the adjacent ends of the guide ribs 112, and the other cross bar beyond the other ends of said guide ribs but adjacent thereto. In this position of the adapter member 114, said member can be moved along the plate section 111 of the anchor plate 110, guided and confined by the ribs 112, until the cross end bars 122 of said member extend into the catch recesses 117 and 120 respectively of the anchor plate 110, whereupon said adapter member is in position to be locked to said anchor plate.

To lock the adapter member 114 in position on the anchor plate 110, there is provided a yoke 125 near one end of the adapter member where the catch 115 is located. The side arms of this yoke 125 are pivotally secured to one end of the side bars 121 respectively and the cross arm between these side arm carries a screw 126 having a knurled thumb head 127. After the adapter member 114 has been straddled over the guide ribs 112 and seated against the plate section 111 of the anchor plate 110 with the cross end bars 122 extending opposite to and in alignment with the catch recesses 117 and 120, the adapter member is slid endwise along the plate section 111 to cause said cross end bars to enter said recesses respectively as described, and the yoke 125 is swung so that it extends beyond one end of the anchor plate alongside of the manikin's foot. In this position of the yoke 125, the screw 126 is turned until it impinges against the outer side of the catch 115 and thereby locks the adapter member 114 in position, as shown in FIGS. 26 and 27. It must be understood that the adapter member 114 is slipped over the anchor plate 110 in the manner described, while the stocking over the manikin's leg is covering the anchor plate, although this stocking is not shown in the drawings, so as not to make the drawings confusing. Because of the flexibility and stretchability of the stocking and the design of the anchor plate 110 and the adapter member 114, the stocking will not be damaged.

With the adapter member 114 secured to the anchor plate 110 on opposite sides of the manikin's foot, the shoe may be slipped onto the foot with the tongues 123 extending outside the shoe, and the tongues may be secured to the jaw arms 35 of the clamp device 11 in the manner described in connection with the construction of FIGS. 1-8.

When it is desired to remove the adapter member 114 from the anchor plate 110, the screw 126 is loosened and the yoke 125 is lifted about its pivot supports, causing the yoke to extend transversely of the adapter member 114. In this position of the yoke 125, using the screw 126 as a handle, the adapter member 114 is slid endwise to release the cross end bars 122 from the catch recesses 117 and 120 and is then moved away from the anchor plate 110, as shown in FIG. 28, to effect complete detachment of the adapter member from the anchor plate.

The construction of FIGS. 24 to 28 has the virtue of simplicity, since the plate 110 serves the functions of an anchor plate, a reinforcing plate for the manikin's foot and an adapter member for the support of the shoeless manikin. Also, the construction of FIGS. 24 to 28 has the virtue of being compact and of effecting firm securement of the adapter member 114 for the support of the shoed manikin with easy quick manipulation.

It is also possible in the construction of FIGS. 24 to 28, to embed the anchor plate 110 into the manikin's foot during the manufacture of the manikin to constitute a permanent part thereof, either in the form of single anchor plates or as part of a bracket, in the manner similar to that shown in FIGS. 18 and 19.

In the construction so far described, the anchor plate has been secured to a manikin's foot made of breakable material, such as plaster, plastic or papier-mâché, to serve not only as part of the means for supporting the manikin but also as part of the means for reinforcing the foot for such support. In the construction of FIG. 29 is shown a manikin, the main section of which is made of breakable material, such as plaster, plastic or papier-mâché, but having a foot C'''' attached thereto, made of strong rigid material, such as cast aluminum or of strong plastic. This foot C'''' is attached to the leg of the manikin in any suitable manner, as for example, in the manner in which manikin parts, such as legs and arms are now attached to the torso of certain types of adjustable manikins. For example, the lower section of the manikin's leg has a metal support plate 130 secured thereto and containing a center headed stud 131 shown in the form of a screw. The upper part of the foot C'''' has a metal part 132 secured thereto and provided with an opening having a round section 134 at one end large enough to permit the head of the stud 131 to pass therethrough, and a narrower section 135 wide enough to permit the shank of the stud to slide therealong but narrow enough to prevent the head of the stud to pass therethrough. If desired, a small offset notch may be provided at the end of the narrower section 135 of the opening to receive the shank of the stud 131 to form a joint in the nature of a bayonet joint between the manikin's leg and the foot C''''.

With the foot of the manikin made of metal or other suitable strong material, the anchor plates are formed integral with the foot. In the construction of FIG. 29, the sides of the foot C'''' have integral therewith adapter plates 110a, similar to the adapter plates 110 in the construction of FIGS. 24–28, and for that purpose have raised flat plate formations 111a corresponding to the plate sections 111, parallel guide ribs 112a corresponding to guide ribs 112, recessed catches 115a at one end of the plates 110a respectively corresponding to the recessed catches 115 and recessed catches (not shown) at the other end of said adapter plates 110a respectively corresponding to the recessed catches 118 in the construction of FIGS. 24–28. The adapter plates 110a may be employed as in the construction of FIGS. 24–28 and may similarly cooperate with the adapter members 114.

In all of the forms of the invention described, the base plate 10 is large enough to support the display figure without the securing of this base plate to the floor. However, as far as certain aspects of the invention are concerned, the base of the support device may be just small enough to secure the parts of the clamp device 11 together, except where said base is to be employed for the storage of the manikin, as in the construction shown in FIGS. 22 and 23. In the case where such smaller base is employed, the clamp devices may be secured to the floor, as for example, by nails, screws or the like.

While the invention has been described with particular reference to specific embodiments, it is to be understood that it is not to be limited thereto, but is to be construed broadly and restricted solely by the scope of the appended claims.

What is claimed is:

1. A support device for a display figure of breakable material, such as plaster, plastic or papier-mâché, having a lower portion simulating a leg and a lower preformed extremity simulating a foot, comprising
 (a) a base,
 (b) reinforcing foot plate means,
 (c) means for securing said reinforcing foot plate means to the preformed foot,
 (d) said reinforcing foot plate means having a configuration which permits it to be effectively secured to preformed feet of different sizes, shapes and postures and being shaped to permit a stocking to be worn over the foot and over the foot plate means without punching or otherwise damaging the stocking when said plate means is secured to said foot, and
 (e) means for removably connecting said foot plate means to said base to support the display figure in upright position without injuring the stocking which may be covering the foot and the reinforcing foot plate means, while applying figure supporting force to said foot through said reinforcing foot plate means.

2. A support device for a display figure of breakable material, such as plaster, plastic or papier-mâché, having a lower portion simulating a leg and a lower extremity simulating a foot, comprising
  (a) a base,
  (b) reinforcing foot plate means including two plate-like elements,
  (c) means for securing said foot plate means to said foot above the sole, with the two plate-like elements flanking the sides of said foot, leaving the sole free from attachment thereto, and including means rigidly interconnecting said plate-like elements,
  (d) means for removably connecting said plate-like elements to said base to support the display figure in upright position without injuring the stocking which may be covering the foot and the reinforcing foot plate means, while applying figure supporting force to said foot through said plate-like elements.

3. In a support device for a display figure of breakable material, such as plaster, plastic or papier-mâché, having a lower portion simulating a leg and a lower preformed foot extremity, the combination comprising
  (a) a base,
  (b) reinforcing means for the foot extremity,
  (c) means for securing said reinforcing means to said preformed foot extremity with at least a part of said reinforcing means located on a side of the foot extremity, said reinforcing means having a configuration permitting it to be effectively secured to preformed feet of different sizes, shapes and postures, and
  (d) means mounted on said base and connected to said reinforcing means on the side of the foot extremity for supporting said figure in upright position on said base.

4. In a support device for a display figure having a lower portion simulating a leg, a lower preformed extremity simulating a foot, and a shoe on said foot, the combination comprising
  (a) a base,
  (b) a foot plate,
  (c) means for securing said foot plate to said preformed foot on the inside of the shoe independently of the size, shape and posture of the foot, and
  (d) means mounted on said base and connected to said foot plate for supporting the shoed figure on said base, said supporting means in operative position extending from said base upwardly along the side of the shoe on its outside, across the upper edge of the shoe and downwardly along side of the foot inside of the shoe to said foot plate.

5. In a support device for a display figure as described in claim 4, said supporting means (d) comprising a tongue connected to said foot plate and extending in operation from said foot plate across the upper end of the shoe and downwardly along the outside of the shoe, and means connecting said base and said tongue.

6. In a support device for a display figure having a lower portion simulating a leg, a lower preformed extremity simulating a foot, and a shoe on said foot, the combination comprising
  (a) a base,
  (b) a stirrup comprising a frame and a tongue secured to said frame,
  (c) means for securing said stirrup to the side of the preformed foot independently of the size, shape and posture of the foot with the frame inside the shoe and the tongue outside said shoe to cause said stirrup to straddle the side of the shoe, and
  (d) means connecting said tongue to said base for supporting the shoed figure in upright position.

7. A support device for a display figure having a lower portion simulating a leg, a lower preformed extremity simulating a foot, and a shoe on said foot, said support device comprising
  (a) a base,
  (b) a pair of foot pieces,
  (c) means for securing said foot pieces to said preformed foot, independently of the size, shape and posture of the foot with said foot pieces on opposite sides of the foot, and
  (d) means mounted on said base and connected to said foot pieces for supporting the shoed figure in upright position, said supporting means comprising tongues connected to said foot pieces respectively and extending in operation from said foot pieces downwardly along the outer sides of the shoe, and arms supported on said base and flanking the shoe in operative position, said arms carrying means at their outer ends for effecting connections to said tongues respectively.

8. A support device for a display figure having a lower portion simulating a leg and a lower extremity simulating a foot, comprising
  (a) a base,
  (b) a pair of foot members,
  (c) means for securing said foot members to the foot for anchorage with said foot members extending along opposite sides of the foot and adapted when the foot has a shoe to extend inside said shoe,
  (d) a pair of adapter side members adapted to be removably secured to said foot members respectively with a shoe on said foot, said adapter side members having respective extensions which in operative positions are located outside of the shoe,
  (e) means for removably connecting the extensions on said adapter side members to said base to support said display figure in upright position with a shoe, and
  (f) means for removably connecting the foot members to said base in the absence of said adapter side members to support said figure in upright position when said foot has no shoe.

9. In a support device for a display figure having a lower portion simulating a leg, and a lower extremity simulating a foot, the combination comprising
  (a) a base,
  (b) means for supporting said display figure from said base while said foot is shoeless, comprising support connection means between the base and a section of said foot, and
  (c) means for supporting said display figure from said base while said foot is wearing a shoe, comprising support connection means extending between said base and said section of the foot and circumventing the shoe,
  (d) at least parts of said supporting means (b) and (c) being interchangeable to adapt said support device selectively for operation either with a shoeless display figure or with a shoed display figure.

10. A support device for a display figure having a lower portion simulating a leg, and a lower extremity simulating a foot, comprising
  (a) a base adapted to extend along the underside of the foot,
  (b) a pair of foot plates,
  (c) means for securing said foot plates to the sides respectively of the foot,
  (d) a first pair of adapter side plates adapted to be removably secured to the opposite sides of said foot plates respectively with said foot shoeless,
  (e) a second pair of adapter side plates interchangeable with said first pair of adapter side plates and adapted to be removably secured to the opposite sides of said foot plates respectively with a shoe on said foot, said second pair of adapter side plates having respective extensions adapted in operative position to be located on the outside of the shoe,
  (f) means for removably securing selectively either of said pairs of adapter side plates to said foot plates respectively, (g) means connecting said first pair of adapter side plates to said base to support said display figure without a shoe, and (h) means for connecting the extensions on said second pair of adapter side plates to said base to support said display figure with a shoe, said last mentioned connecting means having at least a part interchangeable with at least a part of said first mentioned connecting means (g) to permit the support device to be converted selectively for support of a shoeless or a shoed display figure.

11. A support device for a display figure having a lower portion simulating a leg and a lower extremity simulating a foot, comprising
(a) a base,
(b) a first pair of arms adapted to flank the foot,
(c) means for removably supporting said first pair of arms on said base,
(d) means removably connecting said arms (b) to the opposite sides respectively of the foot while the foot is shoeless,
(e) a second pair of arms adapted to flank the foot and interchangeable with said first pair of arms on said supporting means (c), and
(f) means removably connecting said second pair of arms to the opposite sides respectively of the foot while the foot is wearing a shoe, said latter means circumventing the shoe.

12. A support device for a display figure having a lower portion simulating a leg and a lower extremity simulating a foot, comprising
(a) a base,
(b) a pair of posts mounted on said base alongside of each other and standing up from said base,
(c) a pair of arms adapted to flank the foot and carrying respective jaws at their outer ends,
(d) means for removably securing the inner ends of said arms to the upper ends of said posts respectively,
(e) a second pair of arms adapted to flank the foot and carrying respective jaws at their outer ends, said second pair of arms being interchangeable with said first pair of arms on said posts,
(f) means adapted to be secured to the opposite sides of the foot and to receive the jaws from said first pair of arms for the support of said display figure with the foot shoeless,
(g) means adapted to be secured to the opposite sides of the foot and having tongues which in operative position of the support device extend along the outer sides of a shoe while the foot is wearing the shoe,
(h) the jaws on said second pair of arms being adapted to engage said tongues to support the shoed foot,
(i) said means (f) and (g) having at least parts thereof interchangeable on the sides of the foot to convert the support device for use either with a shoeless display figure or a shoed display figure.

13. A support device for a display figure having a lower portion simulating a leg and a lower extremity simulating a foot, comprising
(a) a base,
(b) anchorage means having means for securing said anchorage means to the foot on opposite sides of the foot,
(c) connecting means between said base and said anchorage means comprising a pair of arms flanking the foot in operative position of the support device, and jaws in the form of wedges at the outer ends of said arms respectively,
(d) said anchorage means presenting V-shaped channel conformations on opposite sides of the foot for receiving said jaws for clamping action, and
(e) means for moving said arms relatively towards and away from each other to effect or release said clamping action.

14. A support device for a display figure having a lower portion simulating a leg and a lower extremity simulating a foot, comprising
(a) a base,
(b) anchorage means having means for securing said anchorage means to the foot on opposite sides of the foot,
(c) connecting means between said base and said anchorage means comprising a pair of arms flanking the foot in operative position of the support device,
(d) said anchorage means and the outer ends of said arms presenting interconnectable bearings and trunnions, and
(e) means for moving said arms relatively towards and away from each other to effect clamping action of the arms on said anchorage means or for releasing said clamping action.

15. A support device for a display figure having a lower portion simulating a leg and a lower foot extremity, comprising
(a) a base,
(b) post means secured to said base,
(c) foot holding means secured to said post means and having means for holding a section of the lower foot extremity,
(d) and means supported on and adjustable along said post means for seatably supporting a section of the lower foot extremity to the rear of the section held by said foot holding means, whereby said foot extremity can be supported at selected angles in relation to said base in accordance with the adjustment of said supporting means.

16. A support device for a display figure as described in claim 15, wherein said adjustable supporting means (d) includes a platform to support the heel of a shoe worn by said lower foot extremity.

17. A support device for a display figure as described in claim 15, wherein said adjustable supporting means (d) includes a bar-like section extending across the lower foot extremity near the general region of the heel but inwardly thereof in operative position of the support device to form a seat for said lower foot extremity.

18. A support device for a display figure as described in claim 15, wherein said adjustable supporting means (d) has self-locking means for holding said adjustable supporting means in any adjusted position against downward movement, while permitting said adjustable supporting means to be lifted for adjustment along said post means.

19. A support device for a display figure as described in claim 15, wherein said post means (b) comprises a pair of posts standing on said base alongside of each other, said foot holding means (c) comprises a pair of arms secured to said posts near the upper ends thereof, and flanking said lower foot extremity in operative position of the support device, and said adjustable supporting means (d) is mounted on one of said posts, whereby said one post serves as a supporting rail for said adjustable supporting means.

20. In combination,
(a) a display figure of breakable material, such as plaster, plastic or papier-mâché, having a lower portion simulating a leg and a lower foot extremity, and
(b) reinforcing foot plate means secured to said lower foot extremity and having anchoring means at least on one side of the foot extremity above the sole of said foot extremity with means by which a figure support device may be secured to said foot plate means through said anchoring means to support said display figure in upright position, said foot plate means having a configuration which permits it to be effectively secured to feet of different sizes, shapes and postures.

21. The combination as described in claim 20, wherein said display figure is preformed without the reinforcing plate means and said reinforcing foot plate means comprises a pair of plates with anchoring means on opposite sides of the foot extremity, said plates being separate from said foot extremity and being secured to the sides of the lower foot extremity and means also separate from said foot extremity rigidly interconnecting said plates.

22. The combination as described in claim 20, wherein said reinforcing foot plate means comprises a pair of plates with anchoring means on opposite sides of the foot extremity, said plates being embedded into the side walls of the lower foot extremity of the display figure and forming permanent inseparable parts of said foot extremity and means other than said breakable material rigidly interconnecting said plates.

23. In combination,
   (a) a display figure of breakable material, such as plaster, plastic or papier-mâché, having a lower portion simulating a leg and a lower extremity simulating a foot, and
   (b) a structural bracket built into the foot as to constitute a permanent part thereof and comprising foot anchor plates embedded into the material of the foot on opposite sides thereof and a plate extending between said foot plates and spanning the side walls of the foot, said foot plates having means by which a figure support device may be secured to said foot plates to support said display figure in upright position.

24. The combination as described in claim 23, wherein said foot plates have conformations for directly receiving the jaw ends of a pair of jaw arms flanking the foot and forming part of the figure support device.

25. The combination as described in claim 23, wherein said foot plates have V-grooves respectively therealong forming guides to adjustably receive directly wedge jaws at the ends of a pair of jaw arms flanking the foot and forming part of the figure support device.

26. The combination as described in claim 23, wherein said foot plates have respective holes serving as bearings to receive directly trunnions at the ends of a pair of arms flanking the foot and forming part of the figure support device.

27. In combination,
   (a) a display figure of breakable material, such as plaster, plastic or papier-mâché, having a lower portion simulating a leg and a lower extremity simulating a foot,
   (b) a structural bracket built into the foot as to constitute a permanent part thereof and comprising foot anchor plates embedded into the material of the foot on opposite sides of the foot and a plate extending between said foot plates and spanning the side walls of the foot, and
   (c) a figure support device comprising a base extending along the underside of the foot in operative position of the support device, and connecting means between said base and said foot plates for anchoring said figure onto said base.

28. In a support device for a display figure having a lower portion simulating a leg and a lower foot extremity, the combination comprising
   (a) an anchor member,
   (b) means for securing said anchor member to said lower foot extremity,
   (c) said anchor member in secured position being inside a shoe worn by said lower foot extremity,
   (d) an adapter member to be employed when the foot extremity is to wear a shoe having an open frame section, and
   (e) means for removably securing said adapter member to said anchor member with a portion of said anchor member nested within said open frame section, said adapter member having an extension secured to said open frame section and located on the outside of the shoe when said adapter member is secured to said anchor member while said frame section is inside the shoe, said extension having means for connection to a base through connecting means.

29. In a support device, the combination as described in claim 28, wherein said anchor member (a) is embedded into the sidewalls of the lower foot extremity of the display figure and forms a permanent inseparable part of said lower foot extremity.

30. In a support device for a display figure having a lower portion simulating a leg and a lower foot extremity, the combination comprising
   (a) an anchor member having a plate-like section with a conformation thereon to receive a clamp device for the support of the figure when said foot extremity is not wearing any shoe, and catch means thereon,
   (b) means for securing said anchor member to said foot extremity,
   (c) said anchor member in secured position being inside a shoe when said foot extremity is wearing such a shoe,
   (d) an adapter member to be employed when the foot extremity is to wear a shoe having an open frame section, said open frame section being large enough to encompass said conformation when said frame is seated on said plate-like section and being free of said catch means when said frame section is first seated on said plate-like section, said frame section being slidable along said plate-like section into position to be engaged by said catch means, and
   (e) releasable means for locking said frame section against withdrawal from said catch means,
   (f) said adapter member having an extension secured to said open frame section and located on the outside of the shoe when said adapter member is locked to said anchor member, said extension having means for connection to a base through connecting means.

31. In a support device, the combination as described in claim 30, wherein said conformation constitutes a pair of ribs forming a guide for a jaw on said clamp device, and serving to hold and guide the adapter member as said frame section slides into engagement with said catch means.

32. In a support device for a display figure having a lower portion simulating a leg and a lower foot extremity, the combination comprising
   (a) an anchor member having a plate-like section, and a catch therein with a recess,
   (b) means for securing said anchor member to said foot extremity,
   (c) said anchor member in secured position being inside a shoe when said foot extremity is wearing such a shoe,
   (d) an adapter member to be employed when the foot extremity is to wear a shoe, having a frame section with means for seating said frame section on said plate-like section, said frame section being slidable along said plate-like section into position to extend into said catch recess, said frame section carrying a screw in position to impinge upon said catch to lock said frame section against withdrawal from said catch,
   (e) said adapter member having an extension secured to said open frame section and located on the outside of the shoe when said adapter member is locked to said anchor member, said extension having means for connection to a base through connecting means.

33. In a support device for a display figure having a lower portion simulating a leg and a lower foot extremity, the combination comprising
   (a) an anchor member having a plate-like section with a pair of parallel ribs extending therealong and forming a guide for the jaw of a clamp device for the support of the figure when said foot extremity is not wearing any shoe, and a catch near one end of said ribs spaced therefrom and having a recess therein, the ribs at the other end having respective recesses whereby the latter ends of said ribs form another catch, (b) means for securing said anchor member to said foot extremity, (c) said anchor member in secured position being inside a shoe when said foot extremity is wearing such a shoe, (d) an adapter member to be employed when the foot extremity is to wear a shoe, having an open rectangular frame section comprising a pair of parallel longitudinal side bars and a pair of parallel end bars, said open frame section being large enough to encompass said ribs with the ribs extending along said side bars, but being small enough to confine said frame section for slide movement along ribs when said frame section is slid along said ribs with said frame section seated against said plate-like section of the anchor member, the space between the first mentioned catch and the adjacent ends of the ribs being sufficient to receive one of said end bars, said end bars being opposite said catch recesses when said frame section is in said seated position, whereby upon sliding of the frame section along said anchor member said end bars will enter said recesses and be engaged by said catches, and (e) screw means for releasably locking said adapter member in catch engaging position of said end bars, (f) said adapter member having a tongue extension secured to one of said side bars, whereby said adapter member will be in the form of a stirrup, straddling the shoe with said frame section inside and the extension outside of the shoe, said tongue extension having means for connection to a base through connecting means.

34. A support device for a display figure having a lower portion simulating a leg and a lower foot extremity, comprising (a) a base, (b) a pair of posts mounted on said base alongside of each other and standing up from said base, (c) arms secured to said posts respectively and extending transversely thereof in directions side by side in positions to blank the lower foot extremity while said lower foot extremity rests on a substantially horizontal surface in supported position of said display figure, (d) means for moving said posts relatively laterally in directions to move said arms towards and away from each other without altering the angles of said posts in relation to said base, and (e) means for establishing figure supporting connections between said arms and the opposite sides of said lower foot extremity above the sole of said lower foot extremity.

35. A support device for a display figure as described in claim 34, wherein said moving means (c) comprises a screw, and means responsive to the rotation of said screw for moving said posts relatively towards and away from each other.

References Cited by the Examiner

UNITED STATES PATENTS

| | | | |
|---|---|---|---|
| 1,972,451 | 9/1934 | Lehr | 223—120 |
| 2,418,216 | 4/1947 | Adler | 223—120 |
| 2,520,975 | 9/1950 | Springer | 223—120 X |
| 2,656,957 | 10/1953 | Bloch | 223—120 |
| 2,867,362 | 1/1959 | Bloch | 223—120 |

JORDAN FRANKLIN, *Primary Examiner.*

G. H. KRIZMANICH, *Assistant Examiner.*